US012137336B2

(12) United States Patent
Tian et al.

(10) Patent No.: US 12,137,336 B2
(45) Date of Patent: Nov. 5, 2024

(54) IMMERSIVE MEDIA COMPATIBILITY

(71) Applicant: Tencent America LLC, Palo Alto, CA (US)

(72) Inventors: Jun Tian, Belle Mead, NJ (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 183 days.

(21) Appl. No.: 17/892,976

(22) Filed: Aug. 22, 2022

(65) Prior Publication Data

US 2023/0057207 A1 Feb. 23, 2023

Related U.S. Application Data

(60) Provisional application No. 63/260,508, filed on Aug. 23, 2021.

(51) Int. Cl.
| | |
|---|---|
| *H04S 7/00* | (2006.01) |
| *G02B 27/01* | (2006.01) |
| *G06F 3/01* | (2006.01) |
| *G06F 3/0346* | (2013.01) |
| *G06F 3/16* | (2006.01) |
| *G06T 19/20* | (2011.01) |
| *H04N 21/442* | (2011.01) |
| *H04N 21/81* | (2011.01) |

(52) U.S. Cl.
CPC .......... *H04S 7/303* (2013.01); *H04S 2400/11* (2013.01); *H04S 2400/13* (2013.01)

(58) Field of Classification Search
None
See application file for complete search history.

(56) References Cited

U.S. PATENT DOCUMENTS 10,495,726 B2 * 12/2019 Pusch .................... G06F 3/014
2015/0070274 A1    3/2015 Morozov
(Continued)

OTHER PUBLICATIONS

Demofox, "Converting to and from polar/spherical coordinates made easy". https://blog.demofox.org/2013/10/12/converting-to-and-from-polar-spherical-coordinates-made-easy/. 9 pages. (Year: 2013).*

(Continued)

*Primary Examiner* — Qin Zhu
(74) *Attorney, Agent, or Firm* — ArentFox Schiff LLP (57) ABSTRACT

Aspects of the disclosure provide methods and apparatuses for audio processing. In some examples, an apparatus for media processing includes processing circuitry. The processing circuitry receives first six degrees of freedom (6 DoF) information associated with a media content for a scene in a media application. The first 6 DoF information includes a first spatial location and a first rotation orientation for rotation about a center at the first spatial location. The processing circuitry determines that a rendering platform for rendering the media content is a three degrees of freedom (3 DoF) platform; and calculates, a revolution orientation of the media content on a sphere centered other than the first spatial location, according to at least the first spatial location. The revolution orientation is 3 DoF information associated with the media content for rendering on the 3 DoF platform.

16 Claims, 6 Drawing Sheets

(56) References Cited

U.S. PATENT DOCUMENTS

| | | | |
|---|---|---|---|
| 2018/0329485 A1 | 11/2018 | Carothers et al. | |
| 2020/0112814 A1 | 4/2020 | Kim et al. | |
| 2021/0006924 A1* | 1/2021 | Terentiv | G06F 3/011 |
| 2021/0037335 A1* | 2/2021 | Fersch | H04S 7/303 |
| 2021/0195162 A1* | 6/2021 | Chupeau | H04N 21/816 |
| 2023/0262407 A1* | 8/2023 | Terentiv | H04S 7/304 |
| | | | 381/303 |

OTHER PUBLICATIONS

Supplementary European Search Report issued Nov. 20, 2023 in Application No. 22835542.6. (8 pages).

* cited by examiner

IMMERSIVE MEDIA COMPATIBILITY

INCORPORATION BY REFERENCE

This present disclosure claims the benefit of priority to U.S. Provisional Application No. 63/260,508, "Immersive Media Compatibility" filed on Aug. 23, 2021, which is incorporated by reference herein in its entirety.

TECHNICAL FIELD

The present disclosure describes embodiments generally related to media processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In an application of virtual reality or augmented reality, to make a user have the feeling of presence in the virtual world of the application, video, audio or other stimuli in a virtual scene of the application are perceived as in real world. In some examples, physical movement of the user in the real world is perceived as having matching movement in the virtual scene in the application. Further, the user can interact with the virtual scene using media that is perceived as realistic and matches the user's experience in the real world.

SUMMARY

Aspects of the disclosure provide methods and apparatuses for media processing. In some examples, an apparatus for media processing includes processing circuitry. The processing circuitry receives first six degrees of freedom (6 DoF) information associated with a media content for a scene in a media application. The first 6 DoF information includes a first spatial location and a first rotation orientation for rotation about a center at the first spatial location. The processing circuitry determines that a rendering platform for rendering the media content is a three degrees of freedom (3 DoF) platform; and calculates, a revolution orientation of the media content on a sphere centered other than the first spatial location, according to at least the first spatial location. The revolution orientation is 3 DoF information associated with the media content for rendering on the 3 DoF platform.

In some embodiments, the first spatial location is described in a 3 dimensional (3D) cartesian coordinate system by three coordinate values respectively associated with three axes of the 3D cartesian coordinate system.

In some examples, the processing circuitry receives second 6 DoF information associated with a user of the media application. The second 6 DoF information includes a second spatial location and a second rotation orientation for rotation about a center at the second spatial location. The processing circuitry calculates, the revolution orientation of the media content on the sphere centered at the second spatial location, according to the first spatial location and the second spatial location.

In an example, the processing circuitry calculates a distance between the first spatial location and the second spatial location, the distance being used to adjust a gain for an audio in the media content.

In some examples, the processing circuitry determines a rotation matrix for rotating on the sphere from a starting point on the sphere to the first spatial location on the sphere, and calculates the revolution orientation based on the rotation matrix.

In some examples, the processing circuitry calculates a distance between the first spatial location and the second spatial location, and determines an end point on a unit sphere corresponding to the first spatial location. The unit sphere is centered at the second spatial location, and has a unit radius. The processing circuitry determines a rotation matrix for rotating on the unit sphere from a starting point to the end point, and calculates the revolution orientation based on the rotation matrix.

In some embodiments, the first spatial location is described in a 3 dimensional (3D) polar coordinate system by a radial distance, an azimuthal angle, and a polar angle. In some examples, the processing circuitry converts the azimuthal angle to a yaw angle of the revolution orientation, and converts the polar angle to a pitch angle and a roll angle of the revolution orientation.

In some examples, the media processing device is a media client device, and the processing circuitry renders the media content according to the revolution orientation.

In some examples, the media processing device is a media server device, and the processing circuitry then provides the media content associated with the revolution orientation from the media server device to a media client device.

Aspects of the disclosure also provide a non-transitory computer-readable medium storing instructions which when executed by a computer cause the computer to perform the method for media processing.

BRIEF DESCRIPTION OF THE DRAWINGS

Further features, the nature, and various advantages of the disclosed subject matter will be more apparent from the following detailed description and the accompanying drawings in which.

DETAILED DISCRETION OF EMBODIMENTS

Aspects of the disclosure provide techniques for improving immersive media compatibility. By immersive technologies, immersive media attempts to create, or imitate the physical world through digital simulation. According to an aspect of disclosure, equipment for immersive media applications may support different degrees of freedom, such as 6 degrees of freedom (6 DoF), 3 degrees of freedom (3 DoF), and the like. The equipment supporting 6 DoF can be referred to as 6 DoF platform that includes hardware and software supporting the 6 DoF. The equipment supporting 3 DoF can be referred to as 3 DoF platform that includes hardware and software supporting the 3 DoF. Some media content is generated to interact with a user on a 6 DoF platform and is referred to as 6 DoF media content, and some media content is generated to interact with a user on a 3 DoF platform and is referred to as 3 DoF media content. The present disclosure provides techniques to adjust immersive media content to improve immersive media compatibility. Specifically, the techniques can be applied to 6 DoF media content for use on a 3 DoF platform.

According to some aspects of the disclosure, some technologies attempt to create, or imitate the physical world through digital simulation that is referred to as immersive media. Immersive media processing can be implemented according an immersive media standard, such as Moving Picture Expert Group Immersive (MPEG-I) suite of standards, including "immersive audio", "immersive video", and "systems support." The immersive media standard can support a VR or an AR presentation in which the user can navigate and interact with the environment using six degrees of freedom (6 DoF). 6 DoF refers to freedom of movement of a rigid body in a three-dimensional space. The body motion can include translational motion and rotational motion.

Figure 1A:
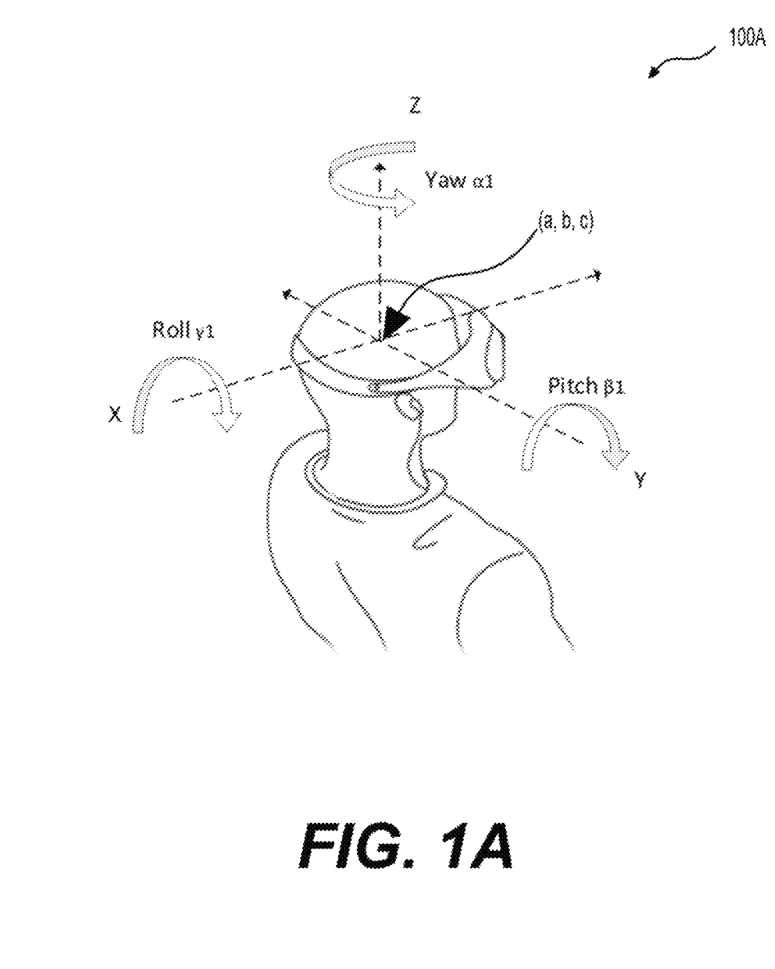
FIGS. 1A-1C show diagrams illustrating environments using 6 degrees of freedom (6 DoF) and 3 degrees of freedom (3 DoF) in some examples.

FIG. 1A shows a diagram illustrating an environment (100A) using 6 degrees of freedom (6 DoF) in some examples. The 6 DoF of movement of a user can include a translational motion and rotational motion. For example, the translational motion can be represented as spatial navigation of the user using location (a, b, c) of the user in a 3-dimensional space, where a change of a is the movement (e.g., forward and backward) along the X axis, a change of b is the movement (e.g., left and right) along the Y axis, and a change of c is the movement (e.g., up and down) along the Z axis. The rotational motion can be represented as orientation of the user using user head orientation ($\alpha1, \beta1, \gamma1$), where $\alpha1$ is the rotation angle about the Z axis and is also referred to as yaw angle, $\beta1$ is the rotation angle about the Y axis and is also referred to as pitch angle, and $\gamma1$ is the rotation angle about the X axis and is also referred to as roll angle. As shown in FIG. 1A, the rotation orientation ($\alpha1, \beta1, \gamma1$) of the user is centered at the spatial location (a, b, c) of the user.

While FIG. 1A illustrates 6 DoF for a user, similar definitions can be applied to other rigid body. For example, 6 DoF can be similarly defined for an audio source, such as a speaker, a virtual object, in the environment (100A).

Figure 1B:
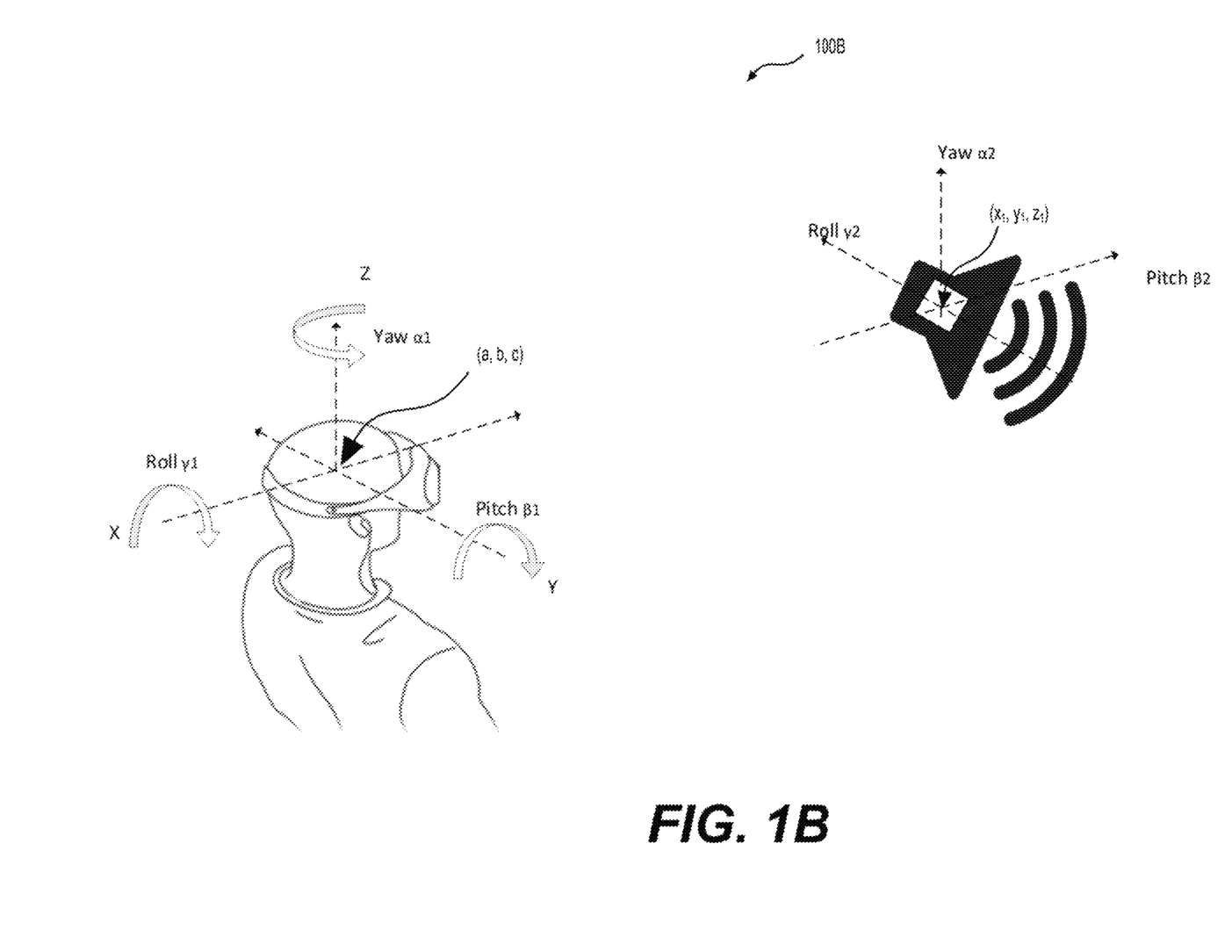

FIG. 1B shows a diagram illustrating an environment (100B) using 6 degrees of freedom (6 DoF) in some examples. The environment (100B) includes a user and a speaker. The 6 DoF of the user is similarly defined as in the environment (100A). For example, the 6 DoF of the user includes spatial location (a, b, c) of the user in a 3-dimensional space, and rotation orientation ($\alpha1, \beta1, \gamma1$) of the user. The rotation orientation ($\alpha1, \beta1, \gamma1$) is defined with a center at the spatial location (a, b, c) of the user.

The 6 DoF of movement of the speaker can include spatial location ($x_1, y_1, z_1$) of the speaker and rotation orientation ($\alpha2, \beta2, \gamma2$) of the speaker. The rotation orientation ($\alpha2, \beta2, \gamma2$) is defined with a center at the spatial location ($x_1, y_1, z_1$) of the speaker.

While FIG. 1B illustrates 6 DoF for a speaker, similar definitions can be applied to other rigid body.

In some use applications, when an immersive media device supports 6 DoF, a user can interact with the 6 DoF media content with the support by the immersive media device. For example, 6 DoF information of the user can be detected by the immersive media device, and the immersive media device can render audio and video of the 6 DoF media content based on the 6 DoF information of the user.

Some immersive media devices, such as of 3 DoF platform, may not support 6 DoF and only allow people to interact with media content (e.g., 3 DoF media content) using 3 degrees of freedom (3 DoF). In some examples of the 3 DoF media content, 3 DoF can refer to orientation information associated with the user and the media. For example, the orientation information of a media in a 3 DoF setting includes the revolution orientation angles of the media residing on a sphere with the user at the center of the sphere. The media can be visual, audio (such as an audio channel, audio object, etc.), or other forms. The orientation information in the 3 DoF setting can be referred to as revolution orientation ($\theta, \phi, \psi$), where $\theta$ is the revolution angle about the Z axis of the user, $\phi$ is the revolution angle about the Y axis of the user, and $\psi$ is the revolution angle about the X axis of the user.

Figure 1C:
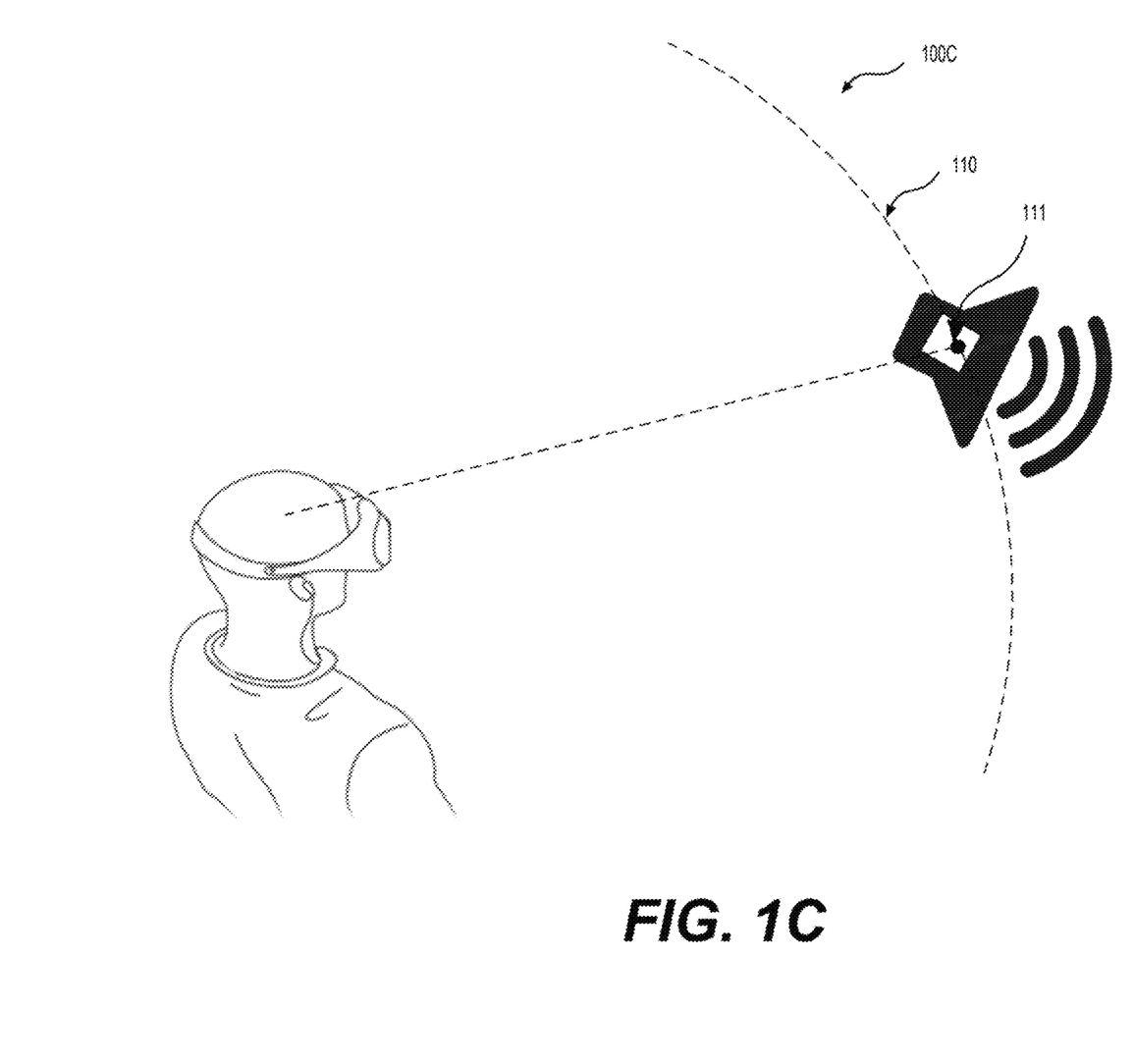

FIG. 1C shows a diagram illustrating an environment (100C) using 3 degrees of freedom (6 DoF) in some examples. The environment (100C) includes a user and a speaker. The speaker is treated as a point (111) on a sphere (110). The center of the sphere (110) is the user. 3 DoF of the speaker is defined as revolution orientation ($\theta, \phi, \psi$) of the point (111) on the sphere (110).

In some applications, a 6 DoF media content may need to be rendered on a 3 DoF platform. The present disclosure provides techniques to adjust 6 DoF media content to 3 DoF media content in order to be rendered on 3 DoF platform.

Figure 2:
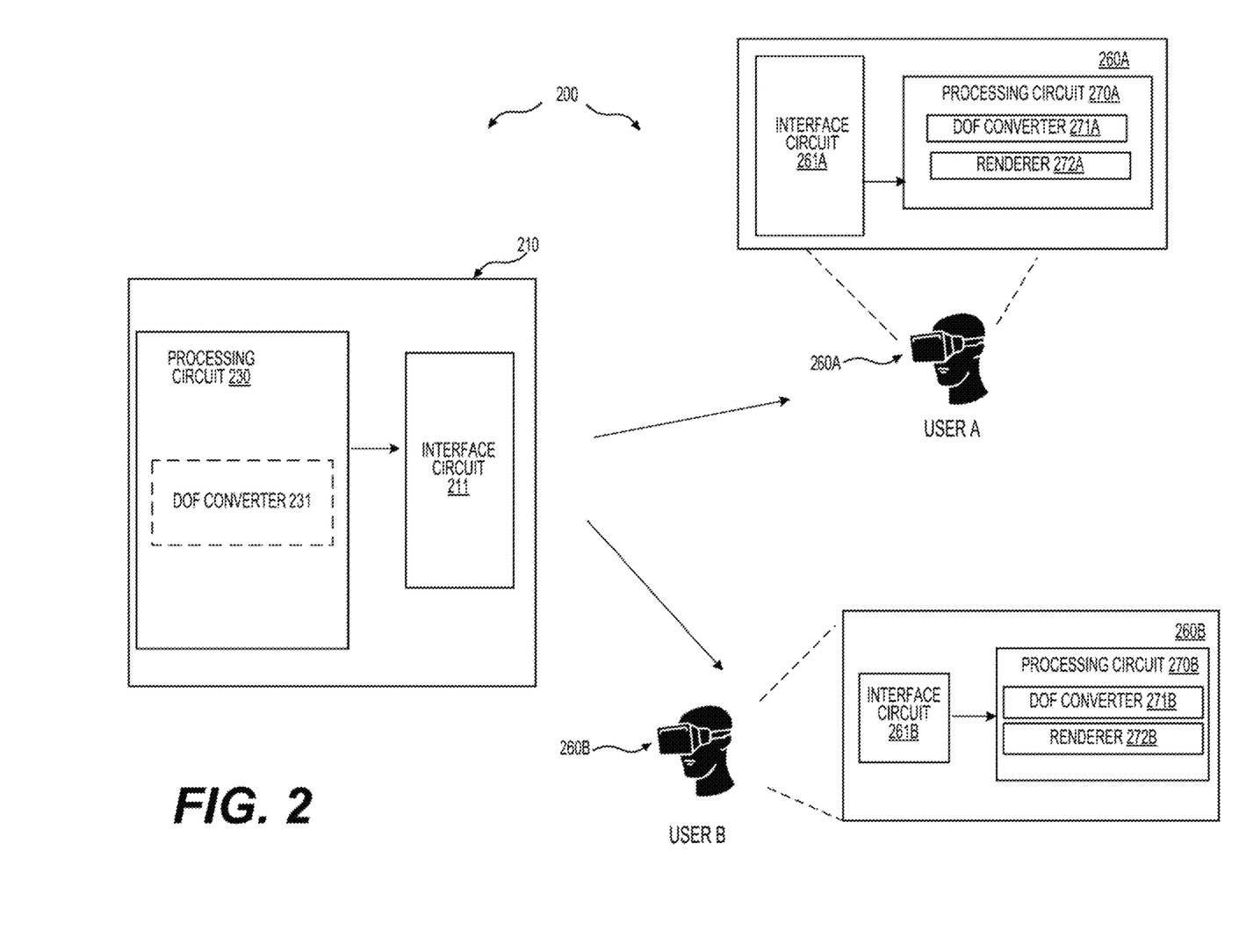
FIG. 2 shows a block diagram of a media system according to an embodiment of the disclosure.

FIG. 2 shows a block diagram of a media system (200) according to an embodiment of the disclosure. The media system (200) can be used in various use applications, such as immersive media application, augmented reality (AR) application, virtual reality application, video game application, sports game animation application, a teleconference and telepresence application, a media streaming application, and the like.

The media system (200) includes a media server device (210) and a plurality of media client devices, such as media client devices (260A) and (260B) shown in FIG. 2, that can be connected by a network (not shown). In an example, the media server device (210) can include one or more devices with audio coding and video coding functionalities. In an example, the media server device (210) includes a single computing device, such as a desktop computer, a laptop computer, a server computer, a tablet computer and the like. In another example, the media server device (210) includes data center(s), server farm(s), and the like. The media server device (210) can receive video and audio content, and compress the video content and audio content into one or more encoded bitstreams in accordance to suitable media coding standards. The encoded bitstreams can be delivered to the media client devices (260A) and (260B) via the network.

The media client devices (e.g., the media client devices (260A) and (260B)) respectively include one or more devices with video coding and audio coding functionality for media applications. In an example, each of the media client devices includes a computing device, such as a desktop computer, a laptop computer, a server computer, a tablet computer, a wearable computing device, a head mounted display (HMD) device, and the like. The media client device can decode the encoded bitstream in accordance to suitable media coding standards. The decoded video contents and audio contents can be used for media play.

The media server device (210) can be implemented using any suitable technology. In the FIG. 2 example, the media server device (210) includes a processing circuit (230) and an interface circuit (211) coupled together.

The processing circuit (230) can include any suitable processing circuitry, such as one or more central processing units (CPUs), one or more graphics processing units (GPUs), application specific integrated circuit, and the like. The processing circuit (230) can be configured to include various encoders, such as an audio encoder, a video encoder, and the like. In an example, one or more CPUs and/or GPUs can execute software to function as the audio encoder or video encoder. In another example, the audio encoder or video encoder can be implemented using application specific integrated circuits.

The interface circuit (211) can interface the media server device (210) with the network. The interface circuit (211) can include a receiving portion that receives signals from the network and a transmitting portion that transmits signals to the network. For example, the interface circuit (211) can transmit signals that carry the encoded bitstreams to other devices, such as the media client device (260A), the media client device (260B), and the like via the network. The interface circuit (211) can receive signals from the media client devices, such as the media client devices (260A) and (260B).

The network is suitably coupled with the media server device (210) and the media client devices (e.g., the media client devices (260A) and (260B)) via wired and/or wireless connections, such as Ethernet connections, fiber-optic connections, WiFi connections, cellular network connections and the like. The network can include network server devices, storage devices, network devices and the like. The components of the network are suitably coupled together via wired and/or wireless connections.

The media client devices (e.g., the media client devices (260A) and (260B)) are respectively configured to decode the coded bitstreams. In an example, each media client device can perform video decoding to reconstruct a sequence of video frames that can be displayed and can perform audio decoding to generate audio signals for playing.

The media client devices, such as the media client devices (260A) and (260B) can be implemented using any suitable technology. In the FIG. 2 example, the media client device (260A) is shown, but not limited to a head mounted display (HMD) with earphones as user equipment that can be used by user A, and the media client device (260B) is shown, but not limited to a HMD with earphones as user equipment that can be used by user B.

In FIG. 2, the media client device (260A) includes an interface circuit (261A), and a processing circuit (270A) coupled together as shown in FIG. 2, and the media client device (260B) includes an interface circuit (261B), and a processing circuit (270B) coupled together as shown in FIG. 2.

The interface circuit (261A) can interface the media client device (260A) with the network. The interface circuit (261A) can include a receiving portion that receives signals from the network and a transmitting portion that transmits signals to the network. For example, the interface circuit (261A) can receive signals carrying data, such as signals carrying the encoded bitstream from the network.

The processing circuit (270A) can include suitable processing circuitry, such as CPU, GPU, application specific integrated circuits and the like. The processing circuit (270A) can be configured to include various components, such a DoF converter (271A), a renderer (272A), video decoder (not shown), audio decoder (not shown) and the like.

In some examples, the audio decoder can decode audio content in an encoded bitstream by selecting a decoding tool suitable for a scheme by which the audio content was encoded, and the video decoder can decode video content in an encoded bitstream by selecting a decoding tool suitable for a scheme by which the video content was encoded. The DoF converter (271A) is configured to adjust the DoF information in the decoded media content to be compatible with the media client device (260A). In an example, the hardware of the media client device (260A) supports only 3 DoF, and the received media content includes 6 DoF media content, then the DoF converter (271A) can convert the 6 DoF media content to 3 DoF media content for playing at the media client device (260A).

Further, the renderer (272A) can generate a final digital product suitable for the media client device (260A) from audio content and video content decoded from the encoded bitstreams. It is noted that the processing circuit (270A) can include other suitable components (not shown), such as mixer, post processing circuit, and the like for further media processing.

Similarly, the interface circuit (261B) can interface the media client device (260B) with the network. The interface circuit (261B) can include a receiving portion that receives signals from the network and a transmitting portion that transmits signals to the network. For example, the interface circuit (261B) can receive signals carrying data, such as signals carrying the encoded bitstream from the network.

The processing circuit (270B) can include suitable processing circuitry, such as CPU, GPU, application specific integrated circuits and the like. The processing circuit (270B) can be configured to include various components, such a DoF converter (271B), a renderer (272B), a video decoder, an audio decoder and the like.

In some examples, the audio decoder can decode audio content in an encoded bitstream by selecting a decoding tool suitable for a scheme by which the audio content was encoded and the video decoder can decode video content in an encoded bitstream by selecting a decoding tool suitable for a scheme by which the video content was encoded. The DoF converter (271B) is configured to adjust the DoF information in the received media content to be compatible with the media client device (260B). In an example, the hardware of the media client device (260B) supports only 3 DoF, and the received media content includes 6 DoF media content, then the DoF converter (271B) can convert the 6 DoF media content to 3 DoF media content for playing at the media client device (260B).

Further, the renderer (272B) can generate a final digital product suitable for the media client device (260B) from audio content decoded from the encoded bitstream. It is noted that the processing circuit (270B) can include other suitable components (not shown), such as mixer, post processing circuit, and the like for further audio processing.

In some examples, the media server device (210) can perform DoF conversion. In an example, the media server device (210) includes a DoF converter (231). In an example, the media server device (210) can receive hardware information from the media client devices, such as the media client device (260A) and the media client device (260B). For example, the media server device (210) receives hardware information from the media client device (260A), the hardware information indicates that the media client device (260A) only supports 3 DoF media content, and is in a low battery state, then the DoF converter (231) can convert the 6 DoF media content to 3 DoF media content. The 3 DoF media content can be suitable encoded and sent to the media client device (260A). In another example, the media server device (210) receives hardware information from the media client device (260B), the hardware information indicates that the media client device (260B) only supports 3 DoF media content, and the media client device (260) lacks processing capability (e.g., not having a DoF converter), then the DoF converter (231) can convert the 6 DoF media content to 3 DoF media content. The 3 DoF media content can be suitable encoded and sent to the media client device (260B).

According to an aspect of the disclosure, a 6 DoF media content can describe media (e.g., sound source, audio channel, audio object, visual object, virtual object, and the like) using 6 DoF that can include spatial location information of the media (in the 3D space), and rotation information (about axes of the media). In some examples, the spatial location information can be provided as (x, y, z) in 3-D cartesian coordinates, where x is the distance along the X axis, y is the distance along the Y axis, and z is the distance along the Z axis. In some examples, the spatial location information can be provided as (r, ω, φ) in polar coordinate system, where r is the radial distance, ω is the azimuthal angle, and φ is the polar angle. The rotation information of the media in 6 DoF can be provided as rotation orientation (α, β, γ), where α is the rotation angle about the Z axis of the media, β is the rotation angle about the Y axis of the media, and γ is the rotation angle about the X axis of the media.

According to another aspect of the disclosure, a 3 DoF media content can describe media (e.g., sound source, virtual object, and the like) using revolution orientation information about the user. In an example, the revolution orientation information of each media in a 3 DoF media content includes the revolution orientation (θ, φ, ψ) of the media residing on a sphere, and the user resides at the center of the sphere. θ is the revolution angle about the Z axis of the center of the sphere, φ is the revolution angle about the Y axis of the center of the sphere, and ψ is the revolution angle about the X axis of the center of the sphere. The media can be visual, audio (such as an audio channel, audio object, etc.), or other forms.

According to some aspects of the disclosure, to adjust a 6 DoF media content to 3 DoF media content, the revolution orientation of each media on the sphere (with the user at the center of the sphere) can be calculated.

In some examples, the spatial location information in the 6 DoF can be described using 3-D cartesian coordinate system. The revolution angles can be calculated based on the spatial location information of the user and the spatial location information of the media. In an example, the spatial location information of the user in 6 DoF is denoted by (a, b, c), and location information of a media in 6 DoF is denoted by $(x_1, y_1, z_1)$. To convert to the 3 DoF media content, the user is assumed to reside at a center of a sphere, and the media is on a surface location of the sphere. The radius r of the sphere can be calculated according to Eq. (1):

$$r = \sqrt{(x_1-a)^2 + (y_1-b)^2 + (z_1-c)^2} \quad \text{Eq. (1)}$$

In some examples, for an audio media (such as an audio channel, audio object, etc.), a media client device may adjust a gain (volume) for the audio media according to the change of the location. In an example, the gain can be adjusted inversely proportion to the radius r.

Further, the spatial location $(x_1, y_2, z_1)$ of the media can be normalized to $(x_2, y_2, z_2)$ that is a location on a unit sphere (radius is equal to 1) with a center at (0,0,0), for example according to Eq. (2), Eq. (3) and Eq. (4):

$$x_2 = \frac{x_1 - a}{r} \quad \text{Eq. (2)}$$

$$y_2 = \frac{y_1 - b}{r} \quad \text{Eq. (3)}$$

$$z_2 = \frac{z_1 - c}{r} \quad \text{Eq. (4)}$$

Further, in some embodiments, based on the normalized location $(x_2, y_2, z_2)$ on the unit sphere, and a starting point, a rotation matrix can be determined, and the revolution angles (θ, φ, ψ) can be determined based on the rotation matrix.

In some examples, the starting point is set to be (0, 0, 1), and rotation matrix R can be determined to satisfy Eq. (5):

$$R \begin{bmatrix} 0 \\ 0 \\ 1 \end{bmatrix} = \begin{bmatrix} x_2 \\ y_2 \\ z_2 \end{bmatrix} \quad \text{Eq. (5)}$$

In an example, the rotation matrix R is determined and has the form of Eq. (6)

$$R = \begin{pmatrix} r_{11} & r_{12} & r_{13} \\ r_{21} & r_{22} & r_{23} \\ r_{31} & r_{32} & r_{33} \end{pmatrix} \quad \text{Eq. (6)}$$

Then, the revolution orientation (θ, φ, ψ) with reference to the starting point can be determined based on the rotation matrix, such as according to Eq. (7), Eq. (8) and Eq. (9) in an example:

$$\theta = \operatorname{atan}\left(-\frac{r_{31}}{\sqrt{r_{32}^2 + r_{33}^2}}\right) \quad \text{Eq. (7)}$$

$$\phi = \operatorname{atan}\left(\frac{r_{32}}{r_{33}}\right) \quad \text{Eq. (8)}$$

$$\psi = \operatorname{atan}\left(\frac{r_{21}}{r_{11}}\right) \quad \text{Eq. (9)}$$

where a tan is the inverse tangent function.

It is noted that, in the above example, point (0, 0, 1) is selected as the starting point for determining the rotation matrix R. The selection of the starting point is exemplary. In some examples, other point, such as (1, 0, 0), (0, 1, 0), and the like can be selected as the starting point for the rotation matrix. The derivation of the revolution angles (θ, φ, ψ) can be suitably adjusted.

According to another aspect of the disclosure, the spatial location information of a media in 6 DOF media content can be described using 3-D polar coordinate system (r, ω, φ), where r the radial distance, ω is the azimuthal angle, and φ is the polar angle. Each of the azimuthal angle ω and the polar angle φ can have 360 degrees of range. According to an aspect of the disclosure, the azimuthal angle ω and the polar angle can be mapped to the revolution angles (yaw θ, pitch φ, roll ψ) in 3 DOF. In an example, the azimuthal angle ω is mapped to yaw θ, and the polar angle φ can be suitably converted to pitch φ, roll ψ. In the example, yaw θ has 360 degrees of range; and pitch φ and roll ψ each has 180 degrees of range. In some examples, when converting the media content from 6 DOF to 3 DOF, the radius information in the spatial location information can be removed and the angular information can be mapped to the revolution angles (yaw $\theta$, pitch $\phi$, roll $\psi$) to fit into 3 DoF media content format.

In an example, the user is at the origin of the 3-D polar coordinate system, the yaw angle $\theta$ can be equal to the azimuthal angle $\omega$.

Figure 3:
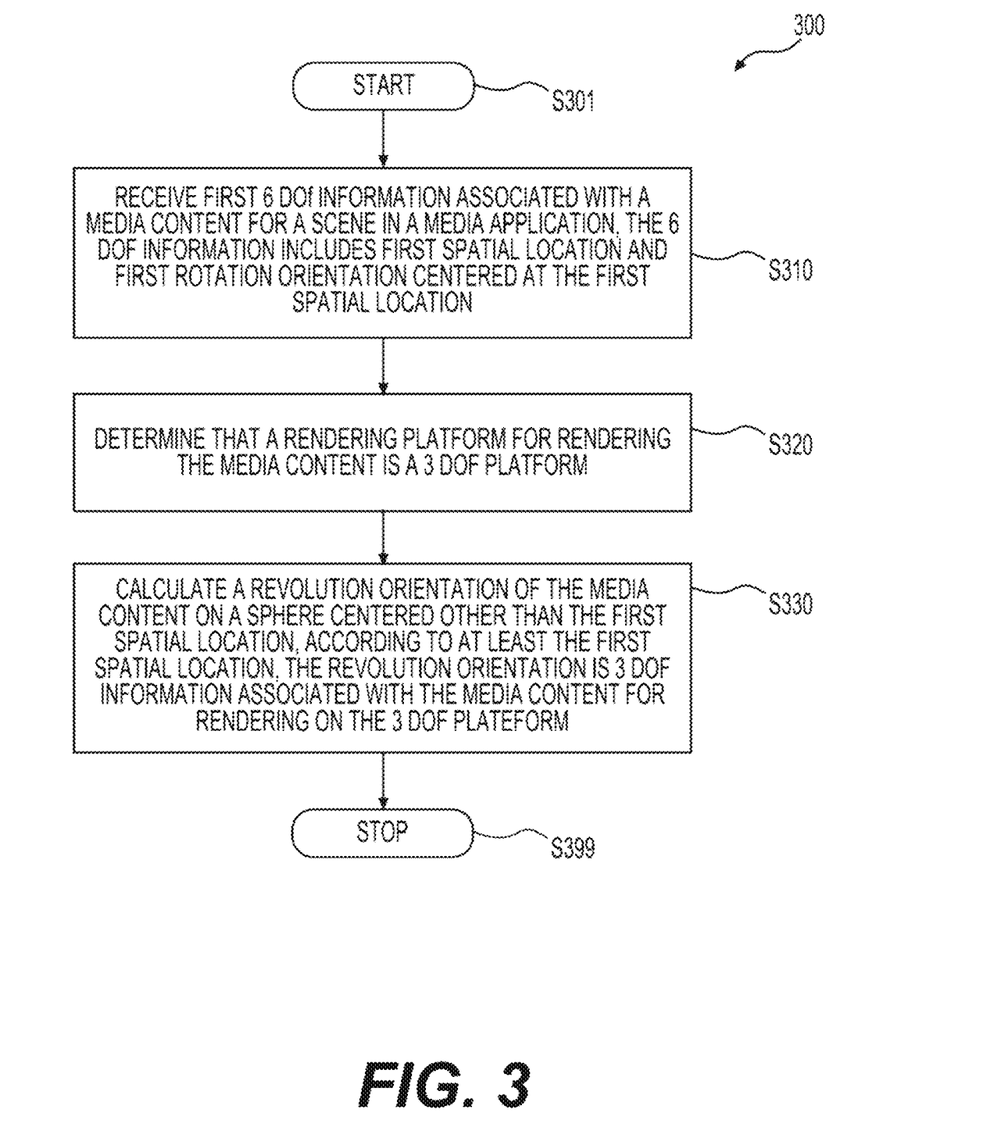
FIG. 3 shows a flow chart outlining a process according to some embodiment of the disclosure.

FIG. 3 shows a flow chart outlining a process (300) according to an embodiment of the disclosure. The process (300) can be performed by a media processing device, such as the DoF converter (231) in the media server device (210), the DoF converter (271A) in the media client device (260A), the DoF converter (271B) in the media client device (260B), and the like. In some embodiments, the process (300) is implemented in software instructions, thus when the processing circuitry executes the software instructions, the processing circuitry performs the process (300). The process starts at (S301) and proceeds to (S310).

At (S310), first 6 DoF information associated with a media content for a scene in a media application is received. The first 6 DoF information includes a first spatial location and a first rotation orientation centered (rotation center) at the first spatial location.

At (S320), the media processing device determines that a rendering platform for rendering the media content is a 3 DoF platform. In an example, the media processing device is a media client device that supports only 3 DoF, and the media processing device can make the determination based on configurations of the media client device. In another example, the media processing device is a media server device, and the media server device can receive signals from a media client device. The signals indicate that the media client device supports only 3 DoF.

At (S330), a revolution orientation of the media content on a sphere centered other than the first spatial location is calculated according to at least the first spatial location. The revolution orientation is 3 DoF information associated with the media content for rendering on the 3 DoF platform.

In some embodiments, the first spatial location is described in a 3 dimensional (3D) cartesian coordinate system by three coordinate values for three axes. In some examples, the media processing device receives second 6 DoF information associated with a user of the media application. The second 6 DoF information includes a second spatial location and a second rotation orientation centered at the second spatial location. The media processing device can calculate the revolution orientation of the media content on the sphere that is centered at the second spatial location, according to the first spatial location and the second spatial location.

In some examples, the media processing device calculates a distance between the first spatial location and the second spatial location. The distance is used to adjust a gain for an audio in the media content.

In some examples, the media processing device determines a rotation matrix for rotating on the sphere from a starting point on the sphere to the first spatial location on the sphere and calculate the revolution orientation based on the rotation matrix.

In some examples, the media processing device calculates a distance between the first spatial location and the second spatial location and determines an end point on a unit sphere corresponding to the first spatial location. The unit sphere is centered at the second spatial location, and has a unit radius. The media processing device then determines a rotation matrix for rotating on the unit sphere from a starting point to the end point, and calculates the revolution orientation based on the rotation matrix. In an example, the starting point is (0, 0, 1), and the revolution orientation can be calculated according to Eq. (7), Eq. (8) and Eq. (9).

In some embodiments, the first spatial location is described in a 3 dimensional (3D) polar coordinate system by a radial distance, an azimuthal angle, and a polar angle. In an example, the media processing device converts the azimuthal angle to a yaw angle of the revolution orientation, and converts the polar angle to a pitch angle and a roll angle of the revolution orientation.

In some examples, the media processing device is a media client device, and the media client device can render the media content according to the revolution orientation.

In some examples, the media processing device is a media server device, and the media processing device can provide the media content associated with the revolution orientation from the media server device to a media client device that uses a 3 DoF platform for rendering the media content.

Then, the process proceeds to (S399) and terminates.

The process (300) can be suitably adapted. Step(s) in the process (300) can be modified and/or omitted. Additional step(s) can be added. Any suitable order of implementation can be used.

The techniques described above, can be implemented as computer software using computer-readable instructions and physically stored in one or more computer-readable media. For example, FIG. 4 shows a computer system (400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 4:
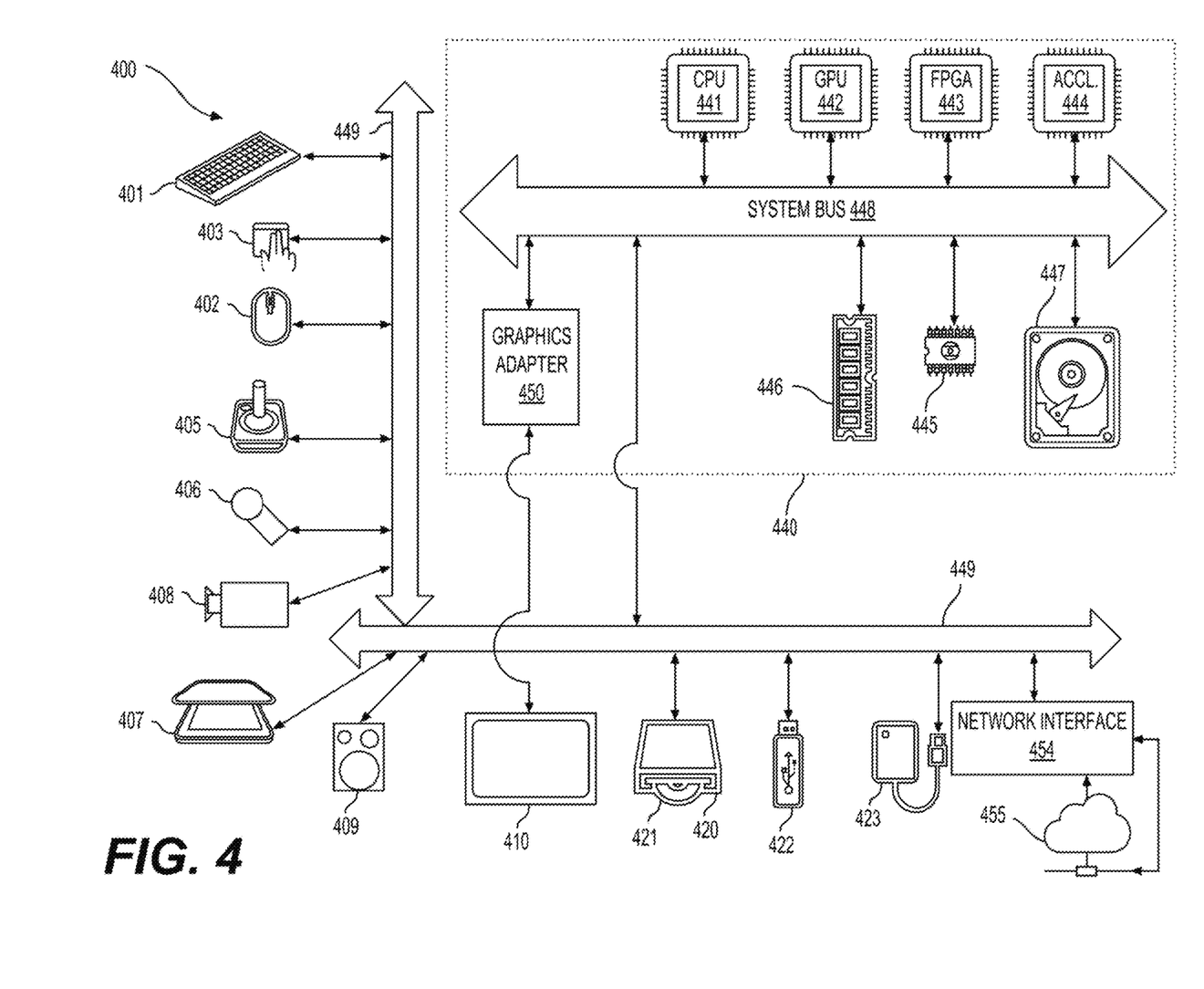
FIG. 4 is a schematic illustration of a computer system in accordance with an embodiment.

The components shown in FIG. 4 for computer system (400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (400).

Computer system (400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (401), mouse (402), trackpad (403), touch screen (410), data-glove (not shown), joystick (405), microphone (406), scanner (407), camera (408).

Computer system (400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (410), data-glove (not shown), or joystick (405), but there can also be tactile feedback devices that do not serve as input devices), audio output devices (such as: speakers (409), headphones (not depicted)), visual output devices (such as screens (410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (400) can also include human accessible storage devices and their associated media such as optical media including CD/DVD ROM/RW (420) with CD/DVD or the like media (421), thumb-drive (422), removable hard drive or solid state drive (423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (400) can also include an interface (454) to one or more communication networks (455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (449) (such as, for example USB ports of the computer system (400)); others are commonly integrated into the core of the computer system (400) by attachment to a system bus as described below (for example Ethernet interface into a PC computer system or cellular network interface into a smartphone computer system). Using any of these networks, computer system (400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (440) of the computer system (400).

The core (440) can include one or more Central Processing Units (CPU) (441), Graphics Processing Units (GPU) (442), specialized programmable processing units in the form of Field Programmable Gate Areas (FPGA) (443), hardware accelerators for certain tasks (444), graphics adapters (450), and so forth. These devices, along with Read-only memory (ROM) (445), Random-access memory (446), internal mass storage such as internal non-user accessible hard drives, SSDs, and the like (447), may be connected through a system bus (448). In some computer systems, the system bus (448) can be accessible in the form of one or more physical plugs to enable extensions by additional CPUs, GPU, and the like. The peripheral devices can be attached either directly to the core's system bus (448), or through a peripheral bus (449). In an example, the screen (410) can be connected to the graphics adapter (450). Architectures for a peripheral bus include PCI, USB, and the like.

CPUs (441), GPUs (442), FPGAs (443), and accelerators (444) can execute certain instructions that, in combination, can make up the aforementioned computer code. That computer code can be stored in ROM (445) or RAM (446). Transitional data can be also be stored in RAM (446), whereas permanent data can be stored for example, in the internal mass storage (447). Fast storage and retrieve to any of the memory devices can be enabled through the use of cache memory, that can be closely associated with one or more CPU (441), GPU (442), mass storage (447), ROM (445), RAM (446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (400), and specifically the core (440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (440) that are of non-transitory nature, such as core-internal mass storage (447) or ROM (445). The software implementing various embodiments of the present disclosure can be stored in such devices and executed by core (440). A computer-readable medium can include one or more memory devices or chips, according to particular needs. The software can cause the core (440) and specifically the processors therein (including CPU, GPU, FPGA, and the like) to execute particular processes or particular parts of particular processes described herein, including defining data structures stored in RAM (446) and modifying such data structures according to the processes defined by the software. In addition or as an alternative, the computer system can provide functionality as a result of logic hardwired or otherwise embodied in a circuit (for example: accelerator (444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of media processing at a media processing device, comprising:
receiving first six degrees of freedom (6 DoF) information associated with a media content for a scene in a media application, the first 6 DoF information comprising a first spatial location and a first rotation orientation centered at the first spatial location;
receiving second 6 DoF information associated with a user of the media application, the second 6 DoF information comprising a second spatial location and a second rotation orientation centered at the second spatial location; and
when a rendering platform for rendering the media content is a three degrees of freedom (3 DoF) platform,
determining a rotation matrix for rotating a starting point on a unit sphere centered at the second spatial location to an end point on the unit sphere, the end point corresponding to the first spatial location, and
calculating a revolution orientation of the media content on the unit sphere based on the rotation matrix, the revolution orientation being 3 DoF information associated with the media content for rendering on the 3 DoF platform.

2. The method of claim 1, wherein the first spatial location is described in a 3 dimensional (3D) cartesian coordinate system by three coordinate values respectively associated with three axes of the 3D cartesian coordinate system.

3. The method of claim 1, wherein the determining the rotation matrix further comprises:
calculating a distance between the first spatial location and the second spatial location, the distance being used to adjust a gain for an audio in the media content.

4. The method of claim 1, wherein the determining the rotation matrix further comprises:
calculating a distance between the first spatial location and the second spatial location; and
determining, based on the distance and the first spatial location, the end point on the unit sphere corresponding to the first spatial location, the unit sphere having a unit radius.

5. The method of claim 1, wherein the media processing device is a media client device, and the method further comprises:
rendering the media content according to the revolution orientation.

6. The method of claim 1, wherein the media processing device is a media server device, and the method further comprises:
providing the media content associated with the revolution orientation from the media server device to a media client device.

7. An apparatus of media processing, comprising processing circuitry configured to:
receive first six degrees of freedom (6 DoF) information associated with a media content for a scene in a media application, the first 6 DoF information comprising a first spatial location and a first rotation orientation centered at the first spatial location;
receive second 6 DoF information associated with a user of the media application, the second 6 DoF information comprising a second spatial location and a second rotation orientation centered at the second spatial location; and
when a rendering platform for rendering the media content is a three degrees of freedom (3 DoF) platform,
determine a rotation matrix for rotating a starting point on a unit sphere centered at the second spatial location to an end point on the unit sphere, the end point corresponding to the first spatial location, and
calculate a revolution orientation of the media content on the unit sphere based on the rotation matrix, the revolution orientation being 3 DoF information associated with the media content for rendering on the 3 DoF platform.

8. The apparatus of claim 7, wherein the first spatial location is described in a 3 dimensional (3D) cartesian coordinate system by three coordinate values respectively associated with three axes of the 3D cartesian coordinate system.

9. The apparatus of claim 7, wherein the processing circuitry is configured to:
calculate a distance between the first spatial location and the second spatial location, the distance being used to adjust a gain for an audio in the media content.

10. The apparatus of claim 7, wherein the processing circuitry is configured to:
calculate a distance between the first spatial location and the second spatial location; and
determine, based on the distance and the first spatial location, the end point on the unit sphere corresponding to the first spatial location, the unit sphere having a unit radius.

11. The apparatus of claim 7, wherein the processing circuitry is configured to:
render the media content according to the revolution orientation.

12. A method of processing a media content for a scene in a media application, the method comprising:
processing a bitstream of the media content for the scene in the media application according to a format rule, wherein the bitstream includes first six degrees of freedom (6 DoF) information associated with the media content for the scene in the media application and second 6 DoF information associated with a user of the media application, the first 6 DoF information comprising a first spatial location and a first rotation orientation centered at the first spatial location, the second 6 DoF information comprising a second spatial location and a second rotation orientation centered at the second spatial location; and
the format rule specifies that when a rendering platform for rendering the media content is a three degrees of freedom (3 DoF) platform,
a rotation matrix for rotating a starting point on a unit sphere centered at the second spatial location to an end point on the unit sphere is determined, the end point corresponding to the first spatial location, and
a revolution orientation of the media content on the unit sphere is calculated based on the rotation matrix, the revolution orientation being 3 DoF information associated with the media content for rendering on the 3 DoF platform.

13. The method of claim 12, wherein the first spatial location is described in a 3 dimensional (3D) cartesian coordinate system by three coordinate values respectively associated with three axes of the 3D cartesian coordinate system.

14. The method of claim 12, wherein the format rule specifies that a distance between the first spatial location and the second spatial location is calculated, the distance being used to adjust a gain for an audio in the media content.

15. The method of claim 12, wherein the format rule specifies that a distance between the first spatial location and the second spatial location is calculated and the end point on the unit sphere corresponding to the first spatial location is determined based on the distance and the first spatial location, the unit sphere having a unit radius.

16. The method of claim 12, wherein the format rule specifies that the media content is rendered according to the revolution orientation.

* * * * *